United States Patent
Wernow et al.

(10) Patent No.: US 8,730,614 B2
(45) Date of Patent: May 20, 2014

(54) SUPPRESSION OF SEEK REPEATABLE RUNOUT

(75) Inventors: Josiah N. Wernow, Minneapolis, MN (US); Raye A. Sosseh, Minneapolis, MN (US); Randall D. Hampshire, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 1 day.

(21) Appl. No.: 13/604,218

(22) Filed: Sep. 5, 2012

(65) Prior Publication Data

US 2014/0063651 A1    Mar. 6, 2014

(51) Int. Cl.
*G11B 5/596*    (2006.01)
(52) U.S. Cl.
USPC ...................................................... 360/78.04
(58) Field of Classification Search
None
See application file for complete search history.

(56) References Cited

U.S. PATENT DOCUMENTS

| | | | |
|---|---|---|---|
| 5,859,742 A | 1/1999 | Takaishi | |
| 5,886,846 A * | 3/1999 | Pham et al. | 360/78.04 |
| 6,169,382 B1 | 1/2001 | McKenzie et al. | |
| 6,493,175 B1 | 12/2002 | Carlson | |
| 6,504,670 B1 * | 1/2003 | Dittmar | 360/78.07 |
| 6,765,747 B1 * | 7/2004 | Sun et al. | 360/77.04 |
| 6,930,853 B2 | 8/2005 | Settje et al. | |
| 7,206,162 B2 | 4/2007 | Semba et al. | |
| 8,144,421 B2 | 3/2012 | Sun et al. | |
| 8,189,286 B1 * | 5/2012 | Chen et al. | 360/77.08 |
| 8,369,041 B2 * | 2/2013 | Sutardja et al. | 360/77.04 |

* cited by examiner

*Primary Examiner* — K. Wong
(74) *Attorney, Agent, or Firm* — Westman, Champlin & Koehler, P.A.

(57) ABSTRACT

The disclosure is related to an apparatus and methods of suppressing seek repeatable runout. In a particular embodiment, a servo loop is disclosed. The servo loop includes a seek signal generation component that generates a seek trajectory acceleration signal. The servo loop also includes a STRRO suppression component that is coupled to the seek signal generation component. The STRRO suppression component injects STRRO suppression signals into the seek trajectory acceleration signal and outputs an STRRO suppressed seek trajectory acceleration signal.

19 Claims, 18 Drawing Sheets

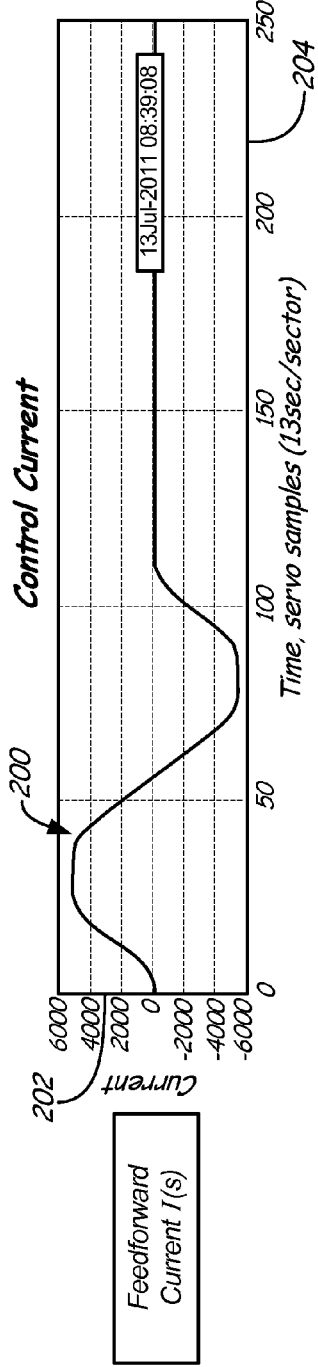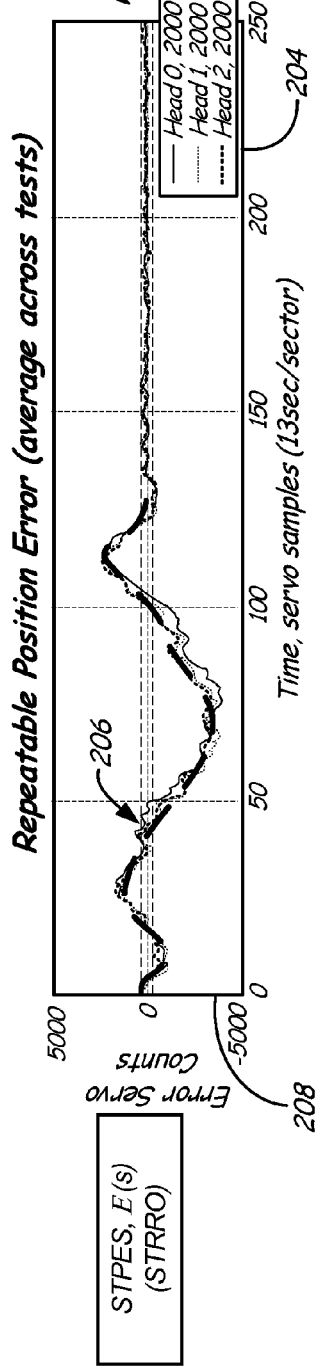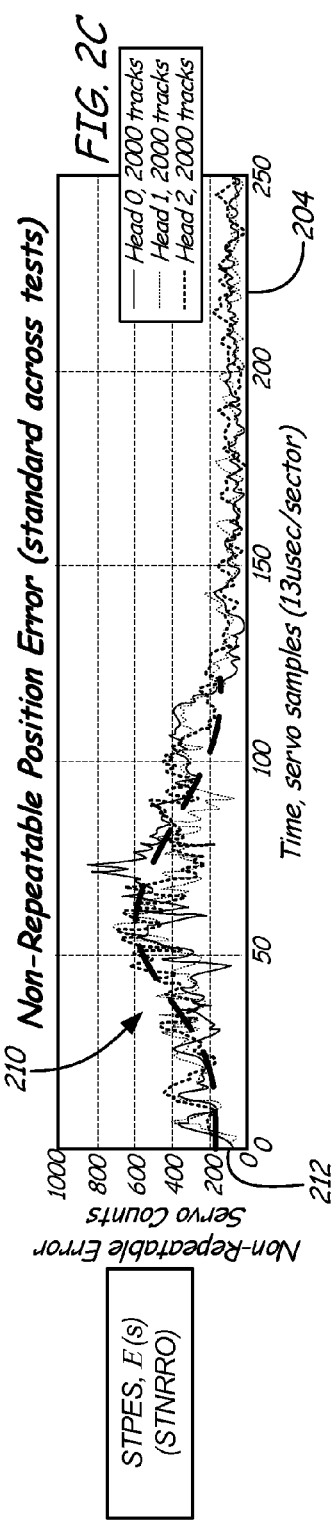

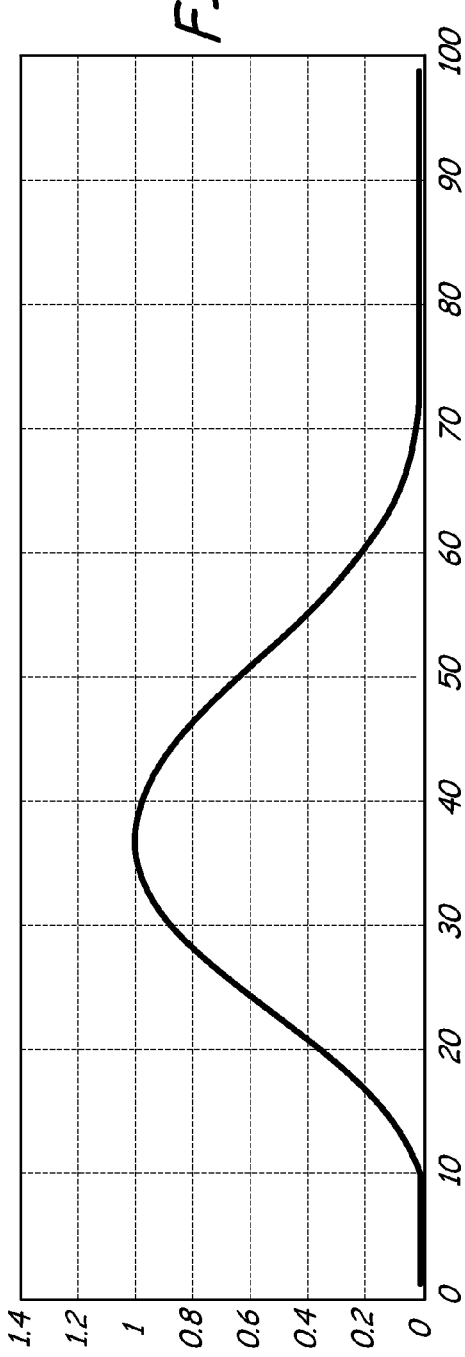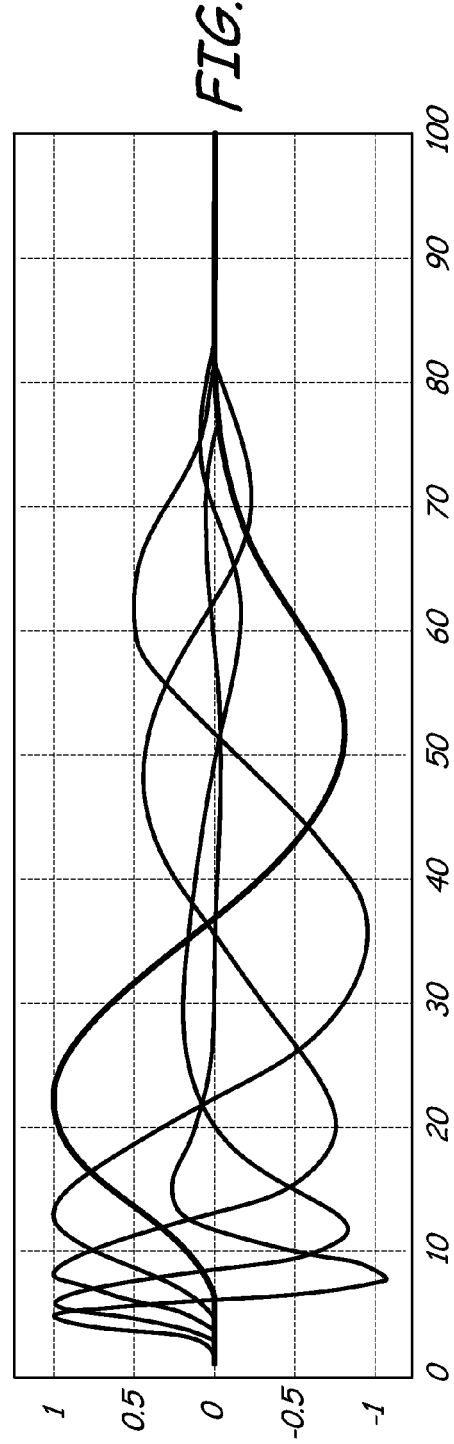

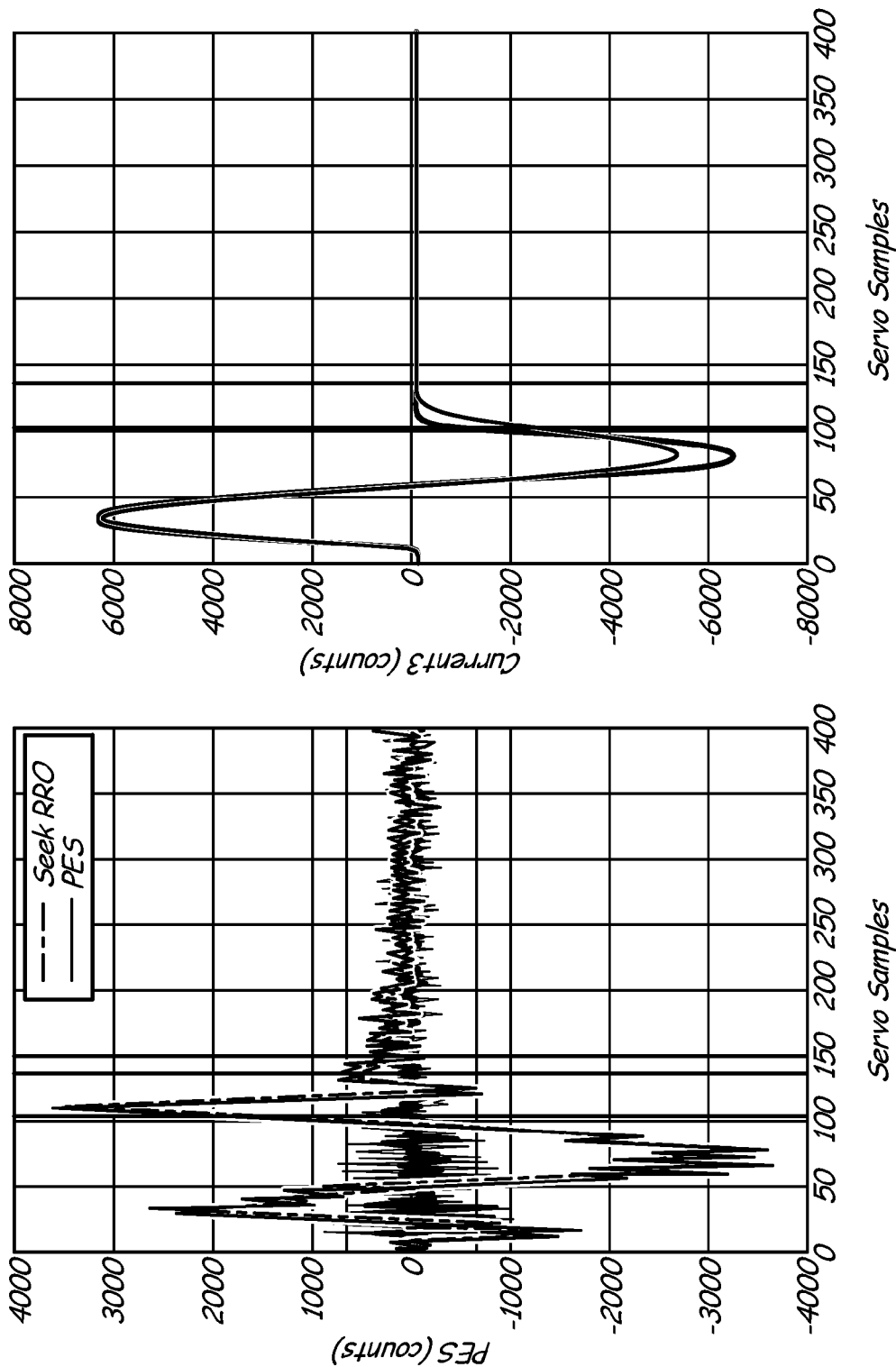

SUPPRESSION OF SEEK REPEATABLE RUNOUT

BACKGROUND

Modern computer systems typically include one or more storage devices, such as disc drive systems, for storing data. The disc drive systems generally store the data in substantially circular tracks on a disk such as magnetic or optical discs. To read and/or write data from a disk, the disc drive systems employ a read/write head to write or read data to and from a specified track on the disc.

A read/write operation typically requires the disc drive system to operate in a seek mode followed by a follow mode. In the seek mode, the disc drive system locates a desired destination track and moves the head to the destination track. In the follow mode, the disc drive system adjusts the position of the head to precisely follow the destination track so that the data can be written to or read from the destination track.

SUMMARY

In a particular embodiment, an apparatus is disclosed. The apparatus includes a seek control system having a seek trajectory repeatable runout (STRRO) suppression component.

In a particular embodiment, a servo loop is disclosed. The servo loop includes a seek signal generation component that generates a seek trajectory acceleration signal. The servo loop also includes a STRRO suppression component that is coupled to the seek signal generation component. The STRRO suppression component injects STRRO suppression signals into the seek trajectory acceleration signal and outputs a STRRO suppressed seek trajectory acceleration signal.

In yet another particular embodiment, a method is disclosed that includes receiving a seek trajectory acceleration signal. The method also includes injecting STRRO suppression signals into the seek trajectory acceleration signal, and outputting a STRRO suppressed seek trajectory acceleration signal.

BRIEF DESCRIPTION OF THE DRAWINGS

FIGS. 2A, 2B and 2C illustrates plots that characterize seek operations;

FIG. 7A through 7M illustrate seek trajectory planning plots employed to develop at least some embodiments;

FIGS. 9A through 9D are graphs of experimental results.

DETAILED DESCRIPTION OF ILLUSTRATIVE EMBODIMENTS

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

The present embodiments deal with suppressing seek trajectory repeatable runout. However, before describing the present embodiments in greater detail, one illustrative data storage environment in which the present embodiments can be used will be described.

Figure 1A:
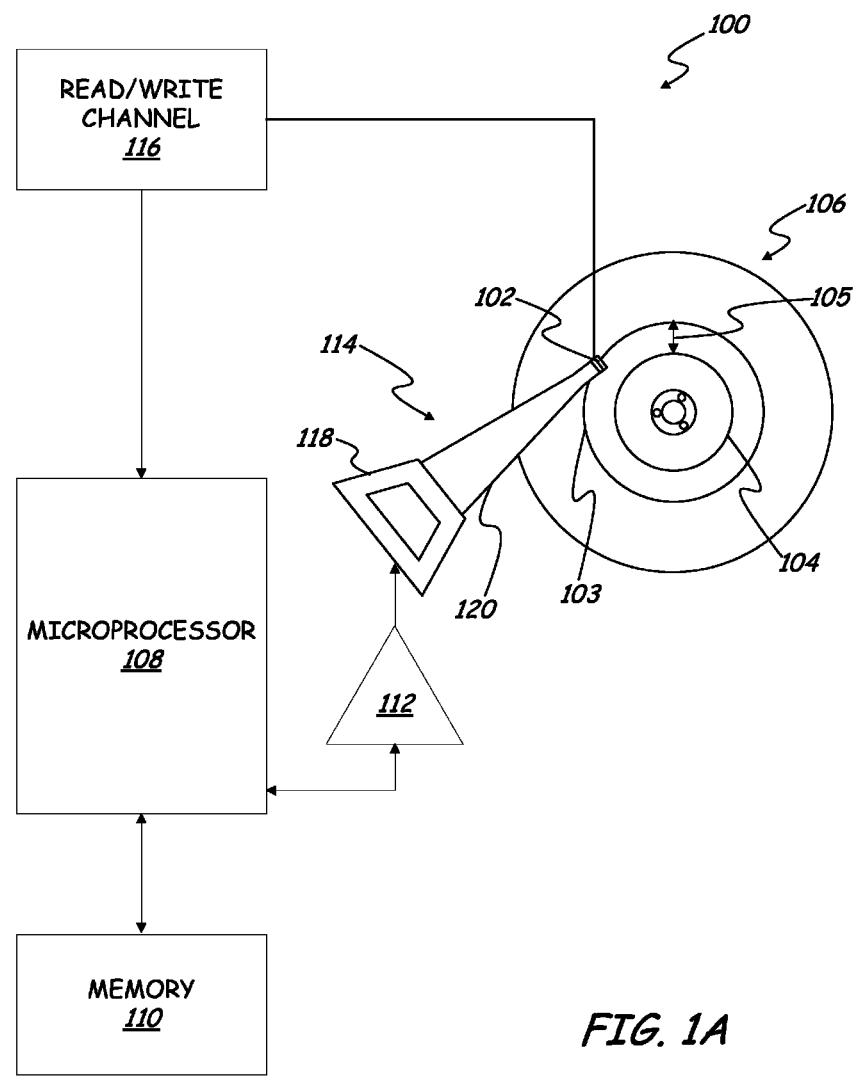
FIG. 1A is a block diagram of one illustrative data storage environment in which exemplary embodiments can be implemented.

FIG. 1A is a block diagram of a disc drive servo loop 100 in which embodiments of the disclosure may be employed. Servo loop 100 controls track seek and track following operations that are required for a head 102 to write or read data to and from a particular track such as 104 on a disc such as 106. In general, servo loop 100 includes a microprocessor 108 having an associated memory 110, a transconductance amplifier 112, an actuator assembly 114, and a read/write channel 116. Actuator assembly 114 includes a voice coil motor (VCM) 118 and an actuator arm 120 that carries head 102. Head 102 is communicatively coupled to read/write channel 116. In operation, microprocessor 108 typically receives a seek command from a host computer (not shown) that indicates that the particular track 104 on the disc 106 is to be accessed. In response to the seek command, the microprocessor 110 determines an appropriate velocity or seek profile to move head 102 from its current position (for example, at an initial track 103) to destination track 104 that is to be accessed. The seek profile is then sent to transconductance amplifier 112 for amplification. The transconductance amplifier 112 then provides a driving current corresponding to the seek profile to a coil of VCM 118. In response to the driving current, the actuator assembly 114 accelerates arm 120 toward the target or destination track 104 and then decelerates and stops the arm 120 when head 102 is over the target track 104 and the seek operation is completed. Then, a position of head 102 is finely adjusted to precisely follow track 102 so that data can be written to or read from the destination track.

Figure 1B:
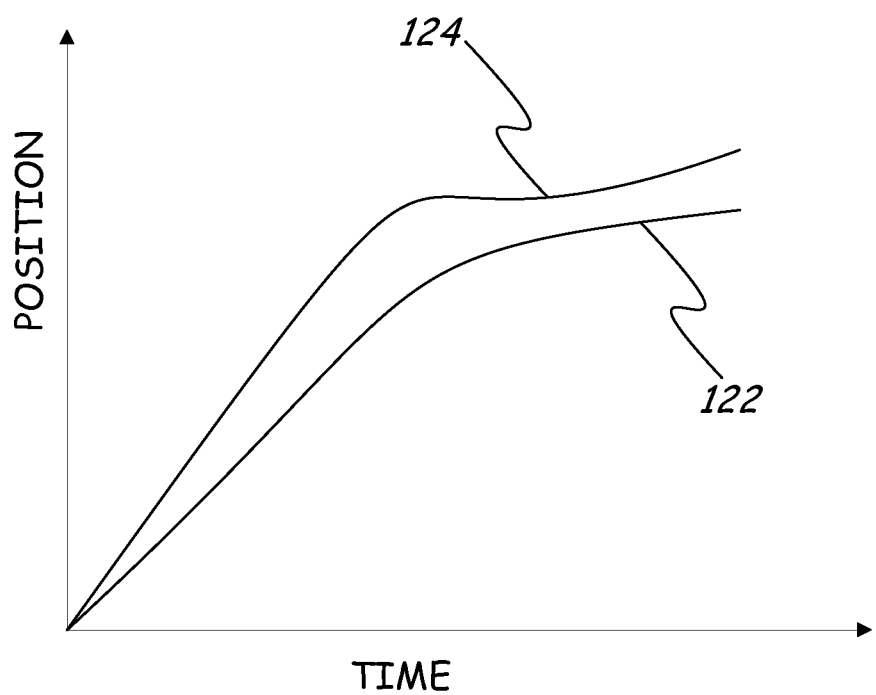
FIG. 1B is a graph that illustrates different seek trajectories.

To establish a basis for developing the present embodiments, track seeking experiments were carried out by first repeating seek operations multiple times over a same seek distance (for example, distance 105 form initial track 103 to destination track 104) and, for each of the multiple seek operations, a difference between a seek trajectory for the respective seek operation and a reference seek trajectory or profile was determined. Each determined difference between the seek trajectory of the respective seek operation and the reference seek trajectory is referred to herein as a seek trajectory position error signal (STPES). Averaging the STPES over the multiple seek operations for the same seek distance provided seek trajectory repeatable runout (STRRO) measurements for that seek distance. A difference between a seek trajectory for a particular one of the multiple seek operations and an average seek trajectory for the multiple seek operations yielded a seek trajectory non-repeatable runout (STNRRO) measurement for that seek operation. Similar measurements were also carried out for different seek distances. These experiments demonstrated that STPES could be separated into STRRO and STNRRO. FIG. 1B is graph illustrating a reference seek trajectory 122 for a particular seek distance and a seek trajectory 124 that represents an average of seek trajectories over multiple seek operations performed over the same particular seek distance. STRRO is a difference between trajectory 122 and trajectory 124. FIGS. 2A, 2B and 2C include graphical representations of results for a 2000 track seek.

FIGS. 2A, 2B and 2C include plots that characterize STPES of a seek operation, carried out multiple times over a seek distance of 2000 tracks, into separate STRRO and STNRRO components. FIG. 2A is a driving current or feedforward current plot 200 with vertical axis 202 denoting current in counts and horizontal axis 204 denoting time in servo samples, with a duration between consecutive samples being 13 microseconds per sector (13 µsec/sector). Plot 200 shows current values at different time instants over the duration of the seek operation. FIG. 2B is a STRRO plot 206, which includes STPES values averaged for multiple repetitions of the 2000 track seek. Horizontal axis 204 in FIG. 2B, which denotes time, is the same as the horizontal axis in FIG. 2A. Vertical axis 208 denotes STRRO in servo counts. FIG. 2C is a STNRRO plot 210 for the 2000 track seek operations. Horizontal axis 204 in FIG. 2C is the same as the horizontal axis in FIGS. 2A and 2B. Vertical axis 212 denotes STNRRO in servo counts. As indicated above, STNRRO and STRRO are STPES components.

As will be described below, in exemplary embodiments of the disclosure, the above-described STPES are addressed as follows:
1) A feedforward STRRO suppression component is employed to suppress at least low-frequency STRRO.
2) An asymmetric seek trajectory profile in which high-frequency STRRO occurs at a seek start and decays by seek completion is utilized.
3) Control action is limited to attenuating STNRRO and any remaining high-frequency STRRO.

Figure 3A:
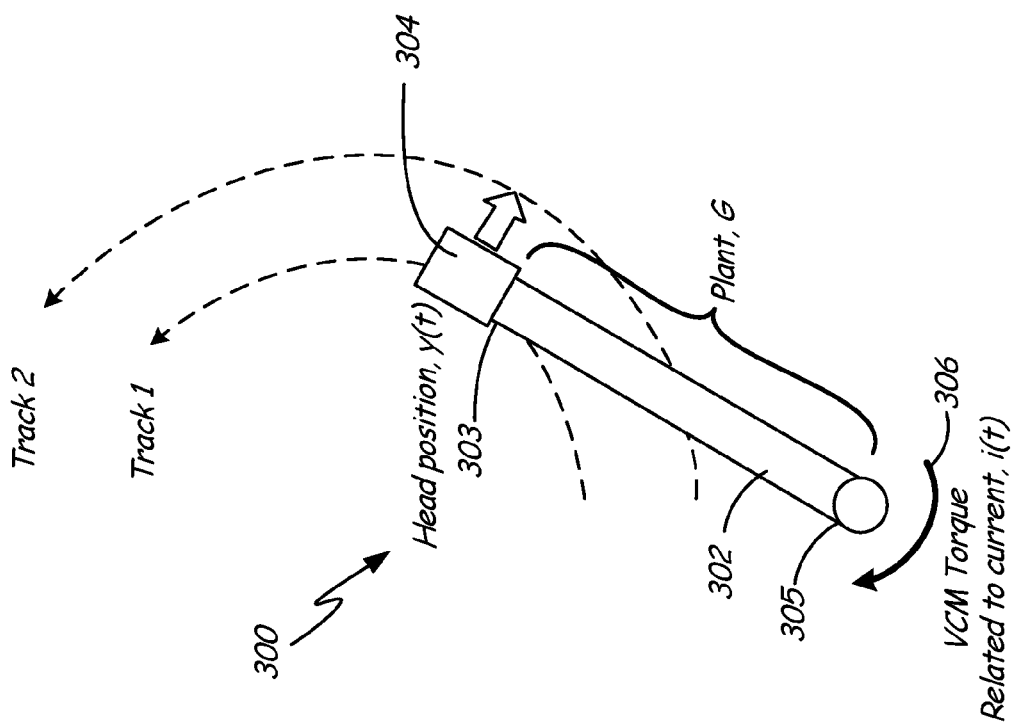
FIG. 3A is a simplified block diagram of an actuator assembly.
Figure 3B:
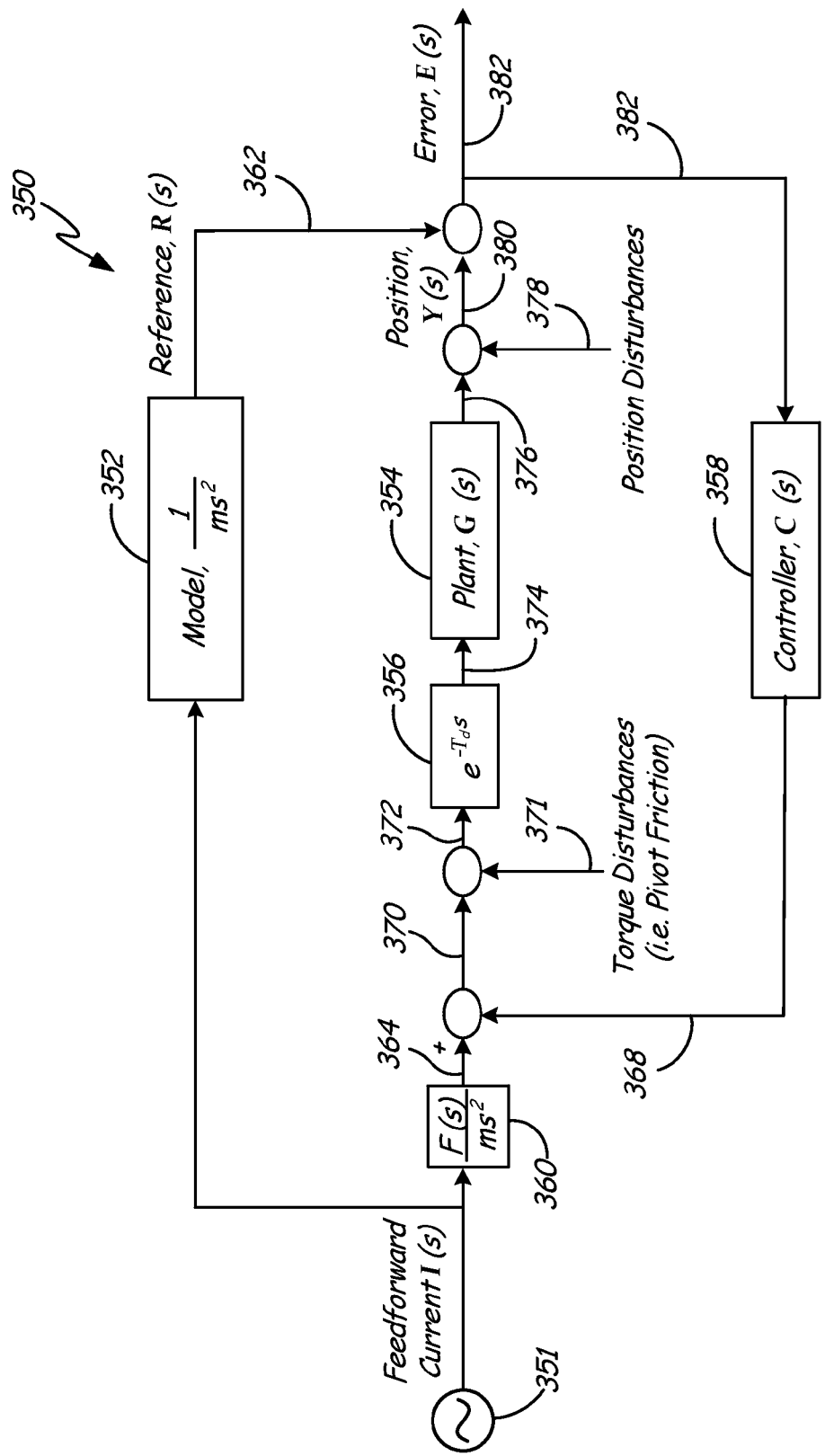
FIG. 3B is a simplified block diagram of a control system in accordance with one embodiment in which the actuator assembly of FIG. 3A is a plant.

FIG. 3A illustrates an actuator assembly 300 and FIG. 3B illustrates a control system 350 that employs a STRRO suppression component to control actuator assembly 300. It should be noted that following description includes s-domain transfer functions used in control systems. The s-domain transfer functions include integration and differentiation operations. The s-domain operation of integration is 1/s and of differentiation is s. Thus, in the description and equations below, higher order derivatives are represented by $s^2$, $s^3$, etc., and higher order integrals are represented by $1/s^2$, $1/s^3$, etc. Also, in the control systems described below, a delay of T seconds is defined in the s domain as $e^{-T_d s}$. Given that these functions are in multiple sections of the following description and in most equations, the meaning of these functions will not be repeated after each equation.

As noted above, FIG. 3A illustrates an actuator assembly 300 that has a first end 303 and a second end 305. Actuator assembly 300 is the system or plant (G) to be controlled. A head 304 is connected to first end 303 of arm 302. A torque, denoted by reference numeral 306, is applied at second end 305 of arm 302 to change a position (y) of head 304 from Track 1 to Track 2, for example. The torque is related to current (i), which is applied to a VCM (such as VCM 118 of FIG. 1 and not shown in FIG. 3) that is attached to arm 302 at second end 305.

As noted above, FIG. 3B illustrates a control system 350 that employs a STRRO suppression component to control actuator assembly 300 in accordance with exemplary embodiments. Control system 350, which controls a seek operation, may be referred to as a model control system since one of its branches includes an actuator model. As can be seen in FIG. 3B, control system 350 includes a seek signal generation component 351, a model 352, an actuator or plant, G(s), 354, a time delay 356, a controller, C(s), 358 and a STRRO suppression component 360. Model 352 is a mathematical representation of actuator or plant 354. Time delay component 356 represents a delay in time between an instant that current is applied to the VCM and the resulting motion of actuator or plant, G(s), 354.

As can be seen in FIG. 3B, in one branch, a feedforward current I, generated by component 351, is input to model 352. Feedforward current I is processed by the model ($1/\text{ms}^2$) 352 in which m represents actuator mass and $1/s^2$ represents a double integration over time to generate a position signal from current I. The position signal generated by model 352 is reference signal, R(s), which is denoted by reference numeral 362. In another branch, feedforward current I is input to STRRO suppression component 360, which injects STRRO suppression signals into current I and generates an output signal 364, which is a STRRO suppressed signal. Details regarding a specific embodiment of STRRO suppression component 360 are provided further below. Signal 364 is combined with signal 368, which is an output signal provided by controller 358. The resulting combined signal 370 is further combined with torque disturbances (for example, pivot friction) 371 to obtain signal 372. A time delay is applied to signal 372 by component 356 and the resulting signal 374 is input to plant 354. Plant 354 produces an output signal 376, which is combined with position disturbances 378 to obtain a position signal, Y(s), 382. A combination of R(s) and Y(s) produces STPES signal, E(s), which is denoted by reference numeral 382. E(s) 382 is input to controller, C(s), 358, which, as noted above, generates output signal 368. As indicated earlier, control action of controller 358 is limited to attenuating STNRRO and any remaining high-frequency STRRO. The introduction of STRRO suppression signals into current I by component 360 results in plant output signal 376 being substantially similar to reference signal R(s), which would not be the case in a control system without an STRRO suppression component.

In a particular embodiment, STRRO suppression component 350 is a feedforward filter that is designed to attenuate STRRO in control system 350. A first step in the design of the feedforward filter is the development of a linear system model of a disc drive servo loop that matches STPES behavior of the disc drive servo loop. For the liner system model, the actuator is characterized as a rigid body with flexible modes. The model for a rigid body actuator is the same a model 352 in FIG. 3B, which is ($1/\text{ms}^2$). Thus, the flexible mode components are added to the rigid body model to obtain Equation 1 below.

$$G(s) = \frac{1}{ms^2} + \sum_{i=1}^{n} \frac{k_i}{s^2 + 2\xi i \omega_{ni} s + \omega_{ni}^2} = \frac{1}{ms^2} \frac{b_{g0} + b_{g1}s + b_{g2}s^2 + b_{g3}s^3 + \ldots + b_{gm}s^m}{s^n + a_{n-1}s^n + \ldots + a_1 s + a_0} \quad \text{Equation 1}$$

In Equation 1, $k_i$ is a gain of the $i^{th}$ flexibel mode component, $\xi_i$ is a damping value for the $i^{th}$ flexibel mode component and $\omega_{ni}$ is a frequency value for the $i^{th}$ flexible mode component. In Equation 1, n is an integer and a summation ($\Sigma$) is carried out over n flexible mode components. A right hand side of Equation 1 includes the transfer function model transfer G(s) expressed as a polynomial with coefficients $b_{g0}$, $b_{g1}$, etc., in the numerator, and coefficients $a_0$, $a_1$, etc., in the denominator.

A time delay function employed in actuator model is as follows:

$$e^{-T_d s} \cong 1 - T_d s + \frac{T_d^2}{2}s^2 - \frac{T_d^3}{6}s^3 + \frac{T_d^4}{24}s^4 + O(s^5) \quad \text{Equation 2}$$

In Equation 2, $T_d$, in seconds, is a delay in time between an instant a current is applied to the VCM and the resulting motion of the actuator or plant.

A combination of Equations 1 and 2 yields a lumped model or lumped transfer function, which is shown in Equation 3 below.

$$P(s) = e^{-T_d s}G(s) = \quad \text{Equation 3}$$
$$\frac{1}{ms^2} \frac{b_0 + b_1 s + b_2 s^2 + b_3 s^3 + \ldots + b_m s^m + \ldots + b_\infty s^\infty}{s^n + a_{n-1}s^n + \ldots + a_1 s + a_0}$$

In Equation 3, $b_{g0}$, $b_{g1}$, etc., and $a_0$, $a_1$, etc., are polynomial coefficients.

Figure 4:
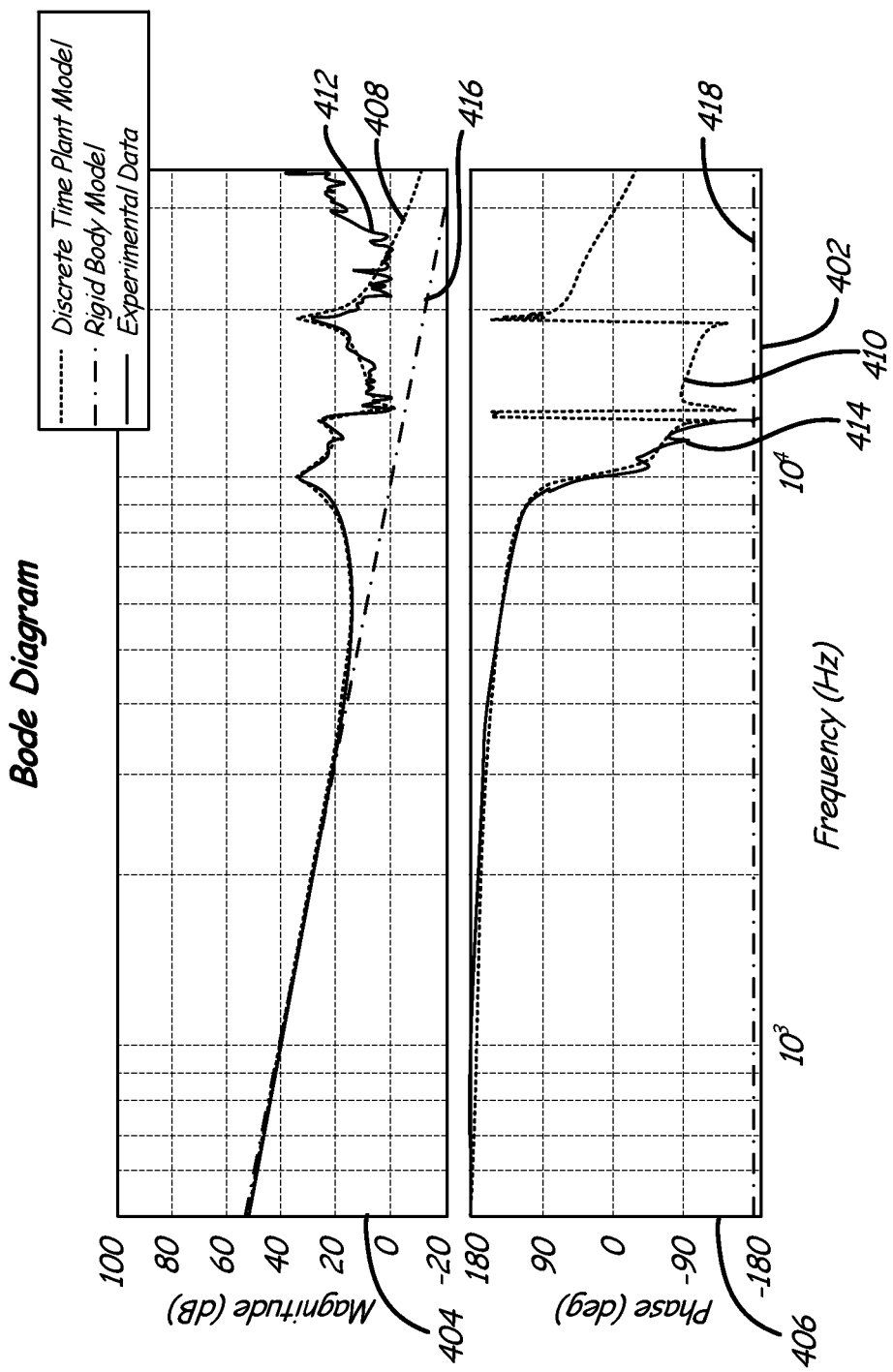
FIG. 4 shows Bode plots of simulation results obtained by using an actuator model developed in accordance with one embodiment.

FIG. 4 shows Bode plots of simulation results using (a) the model described by Equation 3, (b) a rigid body model and (c) experimental data from a disc drive in which seek operations are carried out. The Bode plots include magnitude plots shown in an upper portion of FIG. 4 and phase plots shown in a lower portion of FIG. 4. Horizontal axis 402, which represents Frequency in Hertz (Hz), is common to both the upper magnitude plots and lower phase plots. Vertical axis 404 represents magnitude in decibels (dB) and vertical axis 406 represents phase in degrees. Reference numerals 408 and 410 denote magnitude and phase plots, respectively, of the model described by Equation 3. Reference numerals 412 and 414 denote magnitude and phase plots, respectively, of operation of a disc drive. The plots show that the magnitude 408 and phase 410 of the model described by Equation 3 are similar to the magnitude 412 and phase 414 for the disc drive and therefore verifies a suitability of the model described by Equation 3. Reference numerals 416 and 418 denote magnitude and phase plots, respectively, of the rigid body model.

Figure 5:
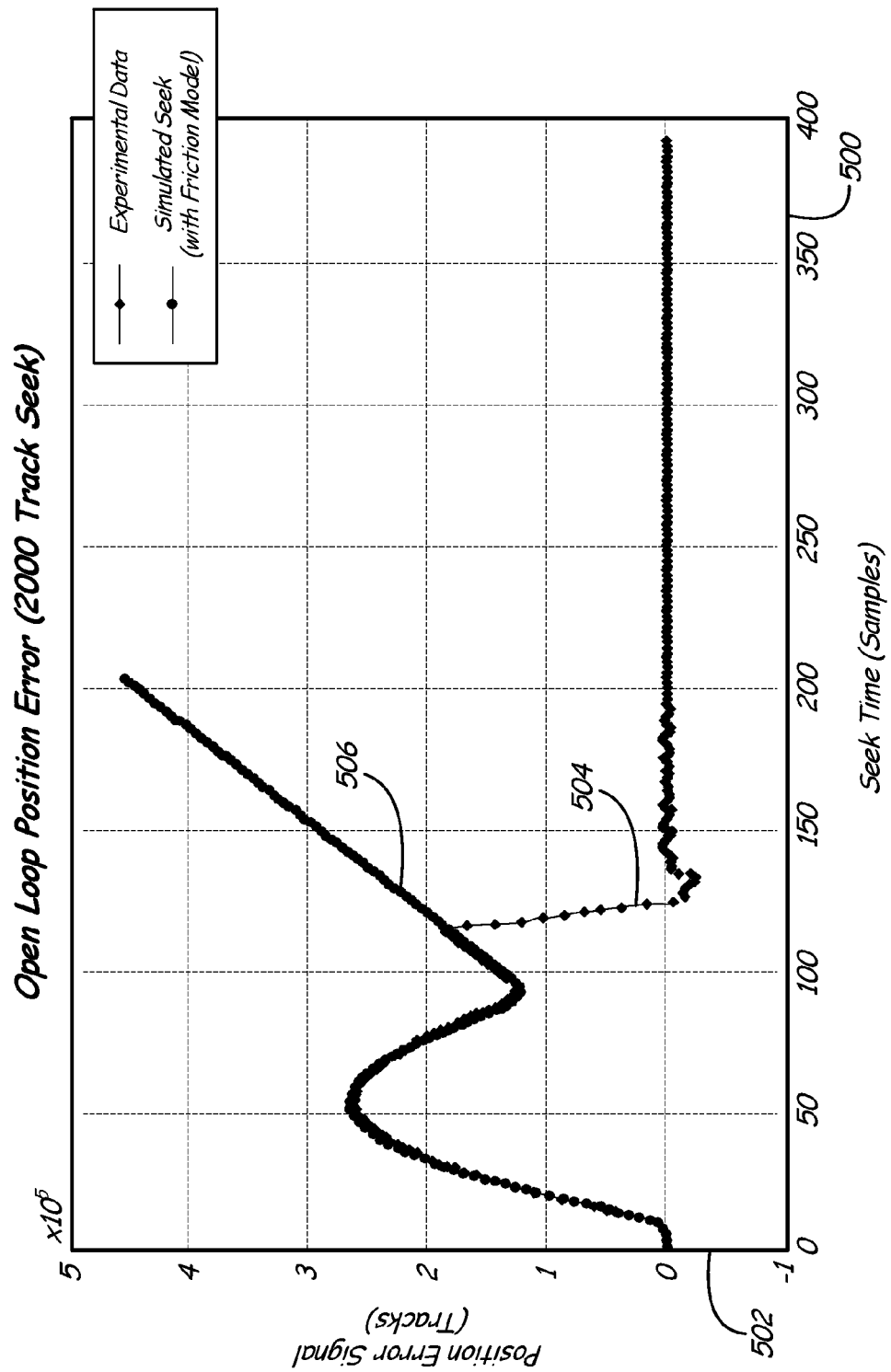
FIG. 5 shows seek trajectory position error signal (STPES) plots that compare experimental STPES data, obtained by carrying out multiple seek operations in a disc drive, with STPES data obtained from similar simulated seeks within an actuator model.

FIG. 5 shows seek trajectory position error signal (STPES) plots that compare experimental STPES data obtained by carrying out multiple seek operations over 2000 tracks in a disc drive with STPES data obtained from similar simulated seeks over 2000 tracks within the actuator model described by Equation 3. In FIG. 5, horizontal axis 500 represents seek time samples and vertical axis 502 represents STPES over different tracks. Plot 504 is the experimental STPES data plot obtained by carrying out the multiple seek operations over 2000 tracks in the disc drive. Plot 506 is the plot of STPES data obtained from similar simulated seeks over 2000 tracks within the actuator model described by Equation 3. Both plots 504 and 506 substantially coincide over a seek duration of about 120 seek time samples. This verifies the suitability of the model described by Equation 3. It should be noted that plots 504 and 506 diverge after the approximately 120 seek time samples because, to prevent an actuator of the disc drive from colliding with discs or other parts of the drive, a closed loop control system within the disc drive ends the actuator motion at approximately 120 seek time samples. The model described by Equation 3 has no such physical actuator and therefore simulated seek operations do not have to end at approximately 120 seek time samples.

After the model described by Equation 3 was determined to be suitable based on the comparisons described in connection with FIGS. 4 and 5, a component to suppress/minimize STRRO was developed based on the model of Equation 3. Different computations involved in the development of the STRRO suppression component are described below in connection with FIG. 6.

Figure 6:
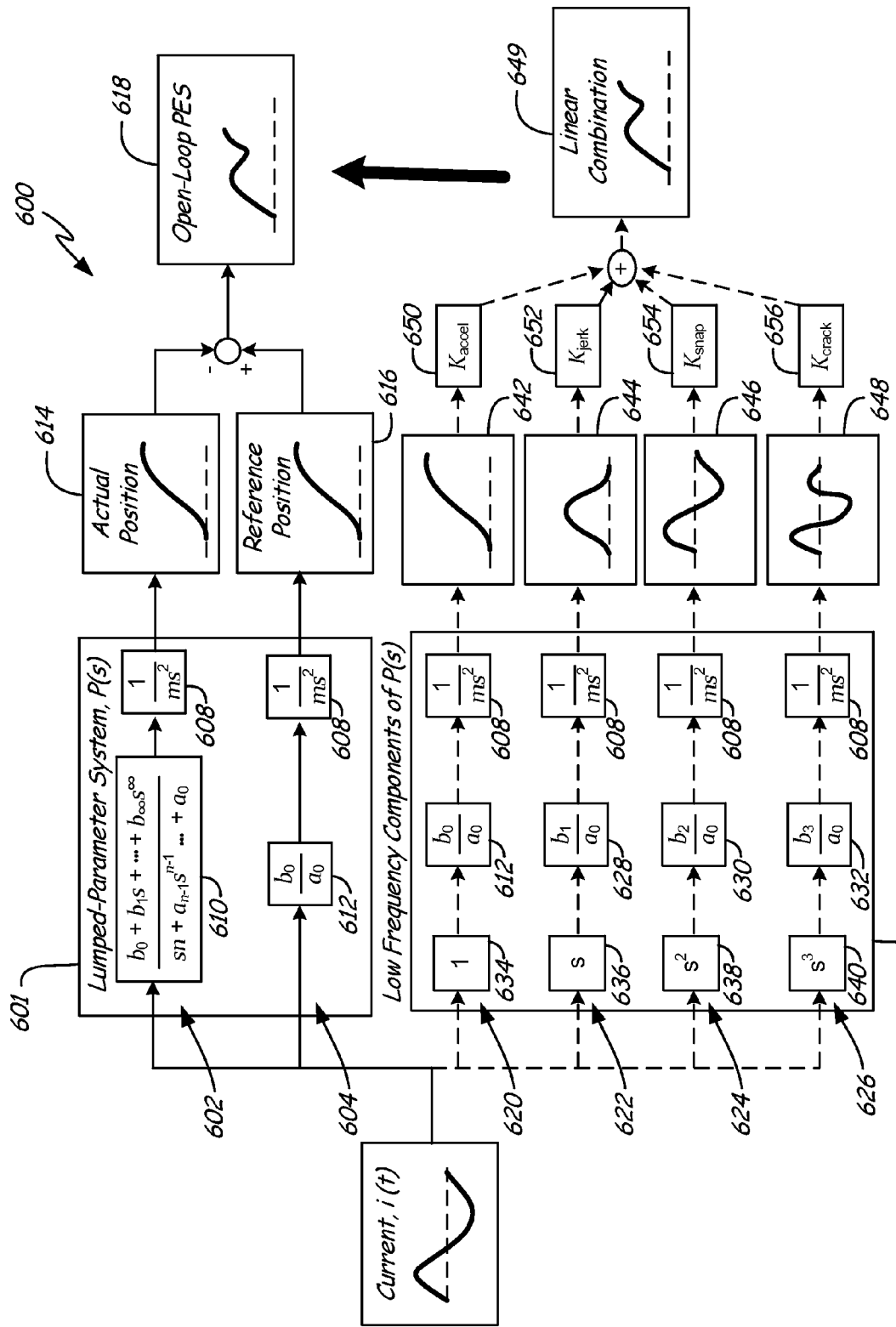
FIG. 6 is a simplified block diagram showing a minimum seek trajectory repeatable runout (STRRO) concept map that illustrates a technique used to develop a STRRO suppression component in accordance with one embodiment.

FIG. 6 is a simplified block diagram showing a minimum STRRO concept map 600 that illustrates a technique that was used to develop the STRRO suppression component. In concept map 600, an upper portion 601 depicts an open-loop STPES determination using the lumped model described by Equation 3 and a rigid body actuator model. Accordingly, upper portion has a first branch 602 that includes a lumped model, P(s), 606, which, as noted earlier, is a combination of a rigid body actuator model 608 and flexible mode components 610. A second branch 604 in upper portion includes rigid body model 608 and a reference gain component 612. In response to receiving current i(t), lumped model 606 provides an actual position output 614. Components 612 and 608 provide reference position output 616 in response to receiving current i(t). Combining actual position 614 and reference position 616 results in open-loop STPES 618.

Concept map 600 further includes a lower portion 619, which is an approximation of upper portion 601 and includes only low frequency components of the lumped model P(s) of Equation 3. Lower portion 619 includes multiple parallel branches 620, 622, 624, and 626, with each of the parallel branches including a rigid body model 608. Additionally, branch 620 includes reference gain component 612, and each of branches 622, 624 and 626 include gain components 628, 630 and 632, respectively, for low frequency components of the lumped model of Equation 3. Branches 620, 622, 624 and 626 also include computation components 634, 636, 638 and 640, respectively. Component 634 does not alter current i(t) and simply outputs i(t) as received. The output of component 634 is an acceleration output. Component 636 determines a first order derivative of current i(t). The output of component 636 is referred to as herein as jerk. Components 638 and 640, determine second and third order derivatives, respectively, of current i(t). The output of component 638 is referred to herein as snap and the output of component 640 is referred to as crack. Outputs of each of components 634, 636, 638 and 640 are multiplied by respective ones of gains 612, 628, 630 and 632. The outputs of each of gain components 612, 628, 630 and 632 are processed by respective ones of the rigid body models 608. The outputs of the respective rigid body models 608 in each of branches 620, 622, 624, and 626 are denoted by reference numerals 642, 644, 646 and 648, respectively. A combination (for example, a linear combination) of outputs 642, 644, 646 and 648 provides a signal 649 that is substantially similar to open-loop STPES 618. This shows that the low frequency approximation of P(s), including the components shown in lower portion 619 of FIG. 6, is sufficient to provide open-loop STPES of the model of Equation 3. As can be seen in FIG. 6, branches 620, 622, 624, and 626 further include adjustable gain components $K_{accl}$ 650, $K_{jerk}$ 652, $K_{snap}$ 654 and $K_{crack}$ 656, respectively. Gains 650, 652, 654 and 656 can be adjusted to minimize open-loop STPES and therefore be used to minimize STRRO when employed in a control system such as 350 (of FIG. 3B). Equations that describe a feedforward filter with gain components $K_{accl}$, $K_{jerk}$, $K_{snap}$ and $K_{crack}$ are provided below. The feedforward filter with these gain components is a specific embodiment of STRRO suppression component 360 (of FIG. 3B).

Equation 4 below is a low frequency approximation of lumped model P(s), which corresponds to portion 619 of FIG. 6.

$$P(s) \approx \frac{1}{a_0 m s^2}(b_0 + b_1 s + b_2 s^2 + b_3 s^3 + \ldots + b_m s^m + \ldots + b_\infty s^\infty)$$ Equation 4

A comparison between Equation 3 and Equation 4 indicates that Equation 4 is obtained by eliminating higher order coefficients, with high frequency dynamics, from the denominator of Equation 3.

A performance objective for designing a control system such as 350 (of FIG. 3B) is to keep a difference between a control output and a reference signal as small as possible when the system is affected by external signals. A quantifying measure for performance is a sensitivity function. A sensitivity function or reference sensitivity is expressed as:

$$T(s) = \frac{E(s)}{R(s)} = \frac{1-PF}{1+PC}$$ Equation 5 where E(s) is an error signal and R(s) is a reference signal. Examples of E(s) and R(s) are included earlier in connection with the description of FIG. 3B. Additionally, in Equation 5, P is the same as P(s) in Equation 3, F is a filter, and C is a controller (such as C(s)).

A feedforward filter function including components $K_{accel}$, $K_{jerk}$, $K_{snap}$ and $K_{crack}$, which are described above in connection with FIG. 6, is as follows:

$$F(s) = K_{accel} s^2 + K_{jerk} s^3 + K_{snap} s^4 + K_{crack} s^5 + K_{pop} s^6 + \ldots$$ Equation 6 where $s^2$, $s^3$, etc., represent higher order derivatives.

Ideally, error signal E(s) should be equal to zero and therefore a design choice is made for PF to be equal to 1 in Equation 5. This is expressed below in Equation 7.

$$T(s) = \frac{1-PF}{1+PC} \Leftrightarrow \text{design } PF = 1$$ Equation 7

Equations 6 and 7 are combined in a manner shown below in Equations 8 and 9 to obtain values for $K_{accel}$, $K_{jerk}$, $K_{snap}$ and $K_{crack}$, etc. For low frequency errors, $$PF \approx \frac{1}{a_0 m s^2}(b_0 + b_1 s + b_2 s^2 + \ldots)$$ Equation 8

$$(K_{accel} s^2 + K_{jerk} s^3 + K_{snap} s^4 + \ldots) =$$

$$\frac{1}{a_0 m} * \Big[ K_{accel}(b_0 + b_1 s + b_2 s^2 + \ldots) +$$

$$K_{jerk}(b_0 s + b_1 s^2 + b_2 s^3 + \ldots) +$$

$$K_{snap}(b_0 s^2 + b_1 s^3 + b_2 s^4 + \ldots) + \ldots \Big] \xrightarrow{design} 1$$

Based on Equation 8, the feedforward gain values are:

$$K_{accel} = \frac{a_0 m}{b_0}$$ Equation 9

-continued $$K_{jerk} = -b_1 K_{accel}$$

$$K_{snap} = -b_1 K_{jerk} - b_2 K_{accel}$$

… etc. …

It should be noted that, in some embodiments, coefficients of G(s), $b_n$, may be scaled by an order of $\{10^{-3}\}$ from $b_0$.

S-domain and time domain representations of a feedforward signal including $K_{accel}$, $K_{jerk}$, $K_{snap}$ and $K_{crack}$, etc., are as follows:

$$I_{ff}(s) = RF = R(s)(K_{accel} s^2 + K_{jerk} s^3 + K_{snap} s^4 + \ldots)$$ Equation 10

$$i_{ff}(t) = K_{accel} \frac{d^2 r}{dt^2} + K_{jerk} \frac{d^3 r}{dt^3} + K_{snap} \frac{d^4 r}{dt^4} + \ldots + K_n r^{[n]}$$ Equation 11

Substantially smooth and accurate derivatives of the reference, r(t) (Equation 11), which are substantially without a time delay, may be obtained by employing a suitable seek velocity trajectory. Seek velocity and acceleration trajectory planning are described below in connection with FIGS. 7A through 7L.

Requirements for a normalized seek velocity profile for use in seek velocity/acceleration planning include:

i) Zero start/stop velocity, $\frac{dr}{dt} = 0$ at $t = 0, 1$ ii) Continuous derivatives and $\frac{d^n r}{dt^n} = 0$ for all $t = (0, 1)$ and all $n$.

A "pole-zero bump function" is introduced for seek trajectory planning in, for example, the velocity domain. As will be seen in examples provided further blow, in such a bump function, a pole is a location where a trajectory and all of its derivatives must decay to zero, and a zero serves to shape the trajectory and its derivatives. One exemplary pole-zero bump function, which satisfies criteria (i) and (ii) listed above, is as follows:

$$v(t) = e^{\left( K \frac{\Pi(t-z_j)}{\Pi(t-p_i)} \right)}$$ Equation 12 where K, $z_j$ (zeros) and $p_i$ (poles) are design parameters and the sign of K is such that the exponent remains negative on t=(0,1). It should be noted that, in addition to velocity, the pole-zero bump function of Equation 12 applies to other earlier-described derivatives such as position, acceleration, jerk, etc. It should further be noted that other functions that satisfy criteria (i) and (ii) listed above may also be used for seek trajectory planning instead of the function in Equation 12. An example of a normalized velocity profile is shown in FIG. 7A. FIG. 7B shows examples of normalized derivatives.

Figure 7D:
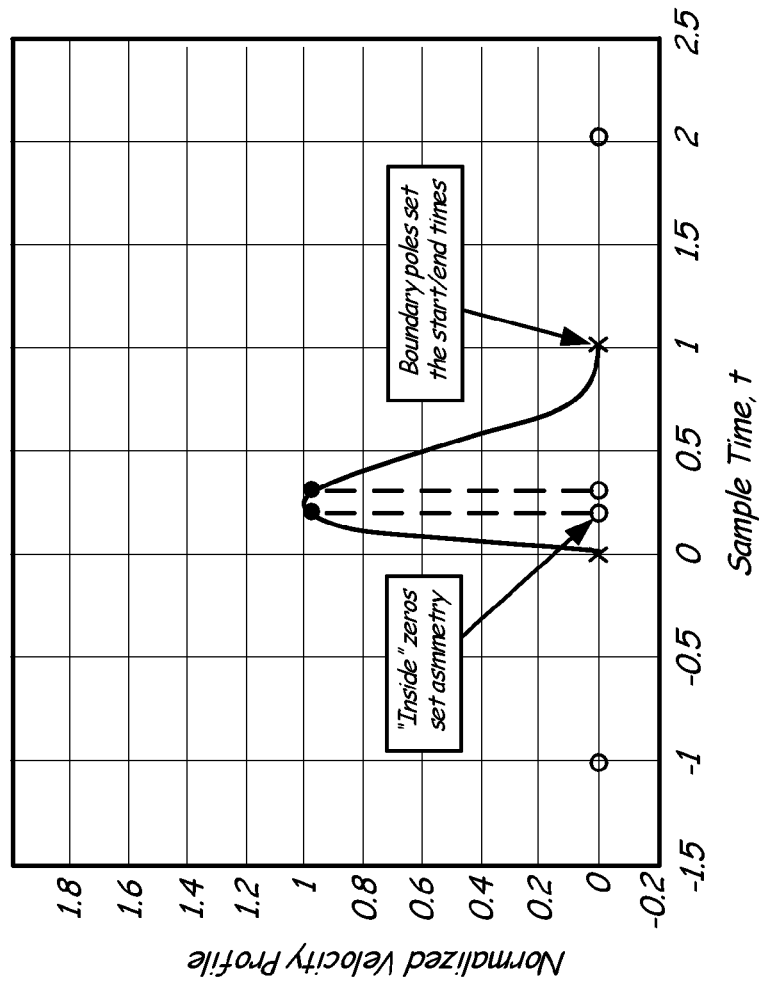
Figure 7C:
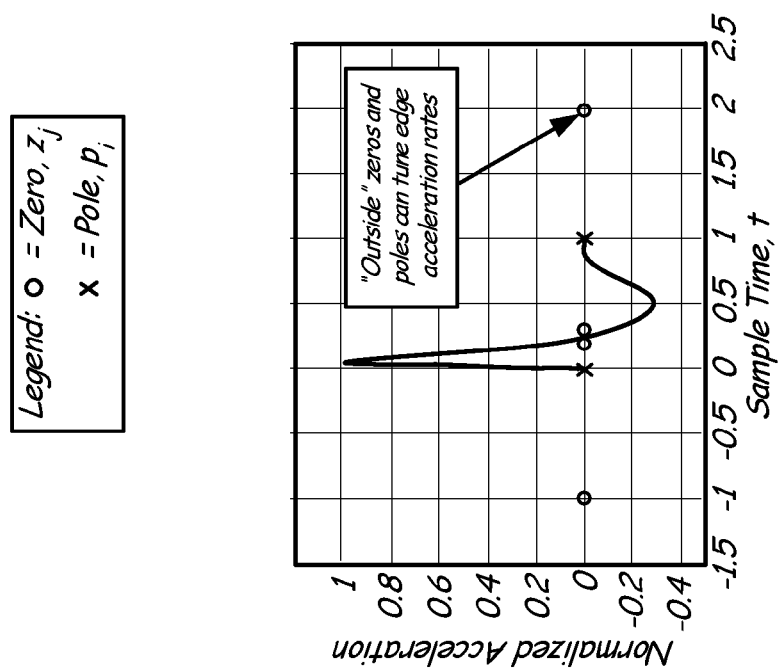

In FIGS. 7C through 7L, horizontal axes represent sample time and vertical axes represent normalized velocity/acceleration. As can be seen in FIGS. 7C and 7D, outside zeros can tune edge acceleration rates and inside zeros can set asymmetry. Boundary poles set start/end times of velocity/acceleration profiles.

Figure 7E:
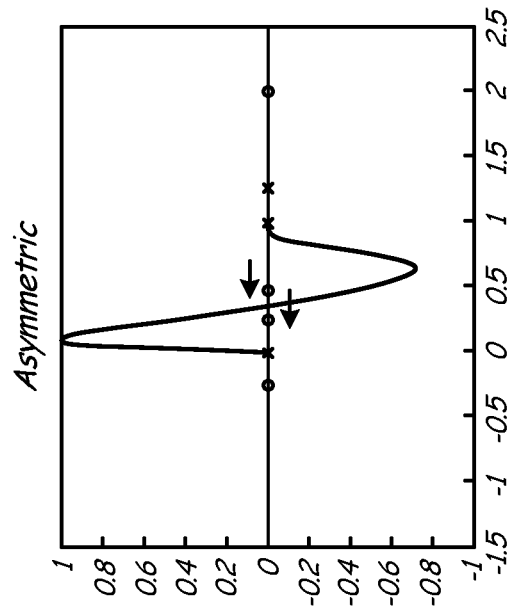
Figure 7F:
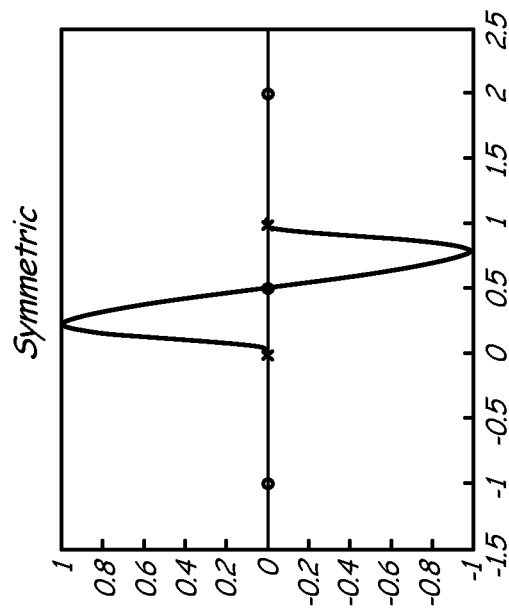

A first step in the trajectory planning is to select a level of asymmetry by choosing locations of inside zeros. FIG. 7E shows a single inside zero in a position that results in a symmetric velocity trajectory. FIG. 7F shows inside zeros moved to produce an asymmetric trajectory.

Figure 7H:
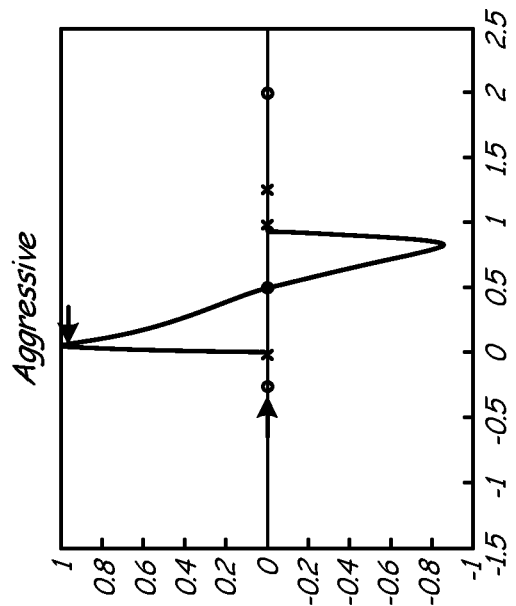
Figure 7G:
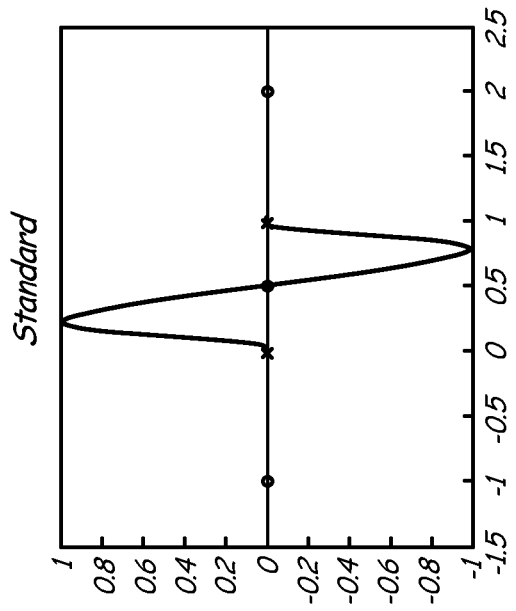

A second step in the trajectory planning involves utilizing a left outside zero to adjust a leading edge of the acceleration profile until a maximum acceleration (or maximum current) is reached. FIG. 7G illustrates a standard trajectory without the left outside zero adjusted. FIG. 7H illustrates an aggressive trajectory in which the left outside zero is moved until the maximum acceleration is reached.

Figure 7I:
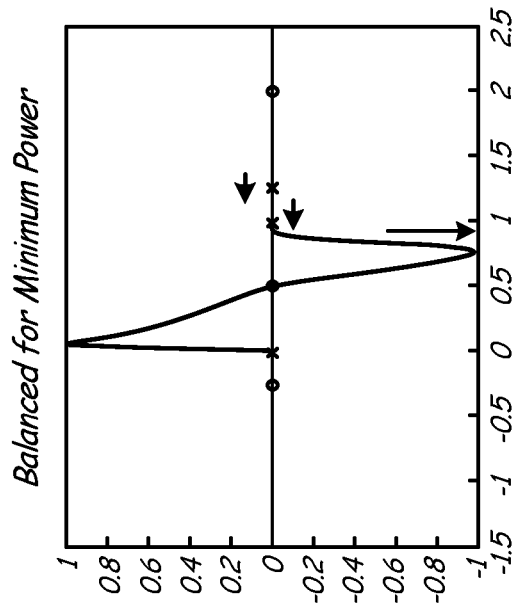
Figure 7J:
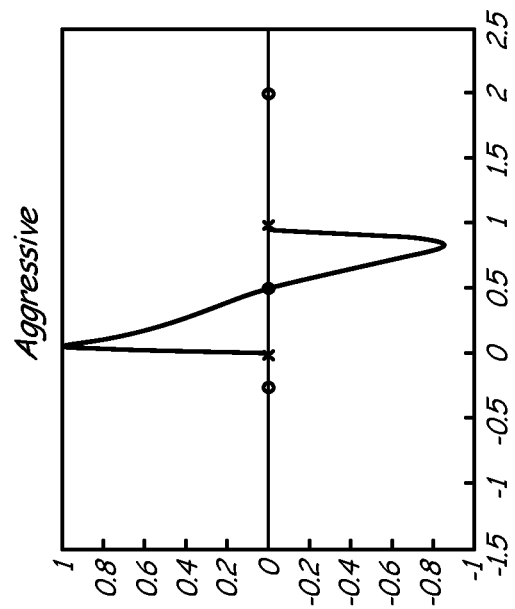
Figure 7L:
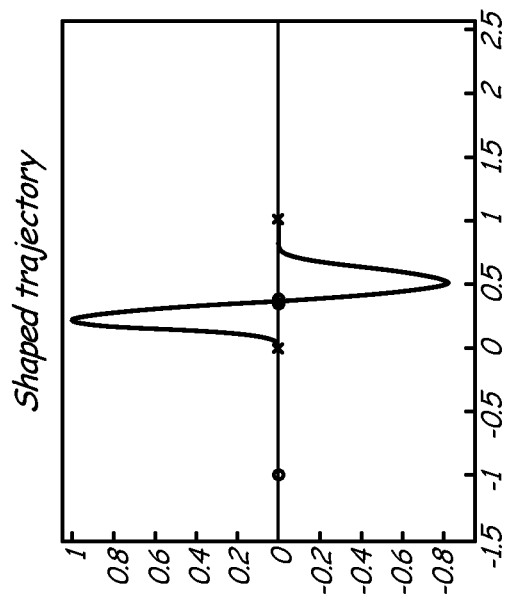

A third step in the trajectory planning is to add a pole on a right side to "push" a seek completion time down until a maximum acceleration equals a maximum deceleration. FIG. 7I, which is a starting trajectory shape to which the third step is applied, is the same aggressive trajectory shown in FIG. 7H. FIG. 7J shows the pole added on the right side to push the seek completion time down until the maximum acceleration equals the maximum deceleration.

Certain basic rules for velocity/acceleration trajectory design are as follows:
1) Poles are required at 0 and 1 to set a start/stop velocity to 0.
2) An even number of zeros are required inside of (0,1).
3) No poles are allowed inside of (0,1).

Certain velocity/trajectory design principles are as follows:
1) A mean of inside zeros sets an asymmetry (approximately at a point at which deceleration begins).
2) Zeros outside a (0,1) region can be used to "pull" the acceleration toward profile edges.
3) Poles outside (0,1) can be used to "push" the acceleration away from profile edges.
4) A distance of each inside zero to its nearest pole can also be used to fine-tune edge acceleration rates.

Figure 7K:
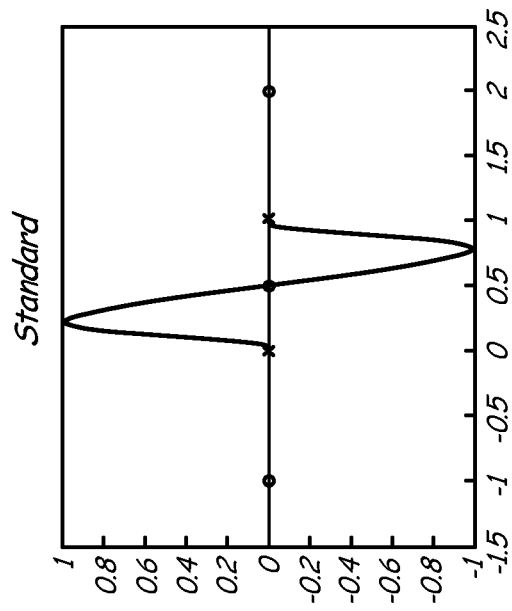
Figure 7M:
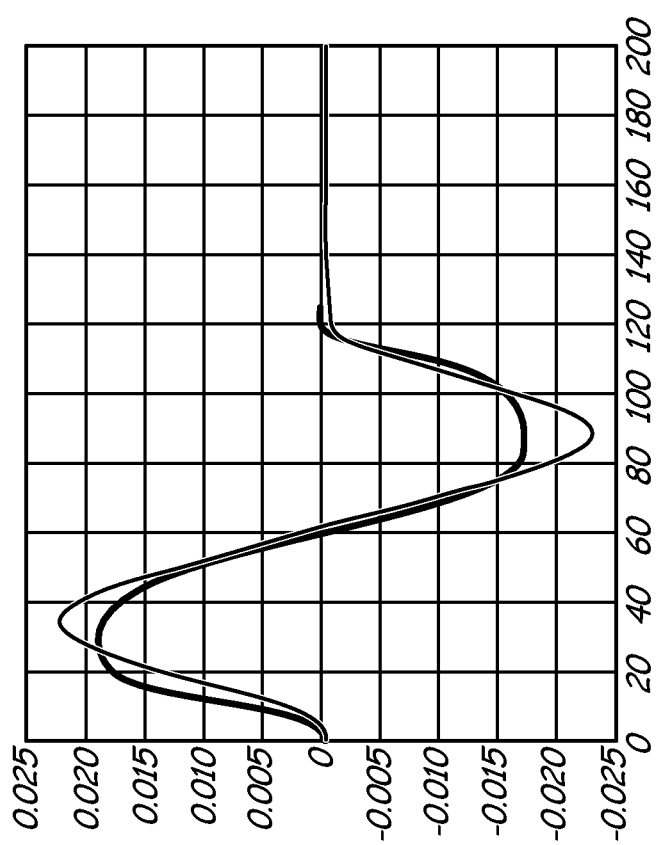

A combination of velocity/acceleration trajectory shaping techniques described above yields a trajectory shape shown in FIG. 7L. FIG. 7K shows a standard trajectory and is included only for comparison with the trajectory shown in FIG. 7L. It should be noted that other possible improvements may be made to a shape of a seek velocity/acceleration trajectory. The other improvements include fine tuning a velocity profile to achieve a substantially optimal level of asymmetry for a given seek length and overlapping pole-zero bump functions to create flat tops in an acceleration profile for power reduction and long seeks. Plot 702 in FIG. 7M illustrates a seek acceleration profile with such improvements.

The above-described improved or substantially idealized seek acceleration or current trajectories can be employed in control system 350 of FIG. 3B. Referring back to FIG. 3B, in some embodiments, seek signal generation component 351 provides an improved or substantially idealized seek trajectory acceleration or current signal that has an asymmetric profile which causes high-frequency STRRO to occur at a seek start and causes the high-frequency STRRO to decay by seek completion. As indicated earlier, in control system 350, STRRO suppression component 360 suppress low-frequency STRRO and control action by controller 358 is limited to attenuating STNRRO and any remaining high-frequency STRRO.

Figure 8:
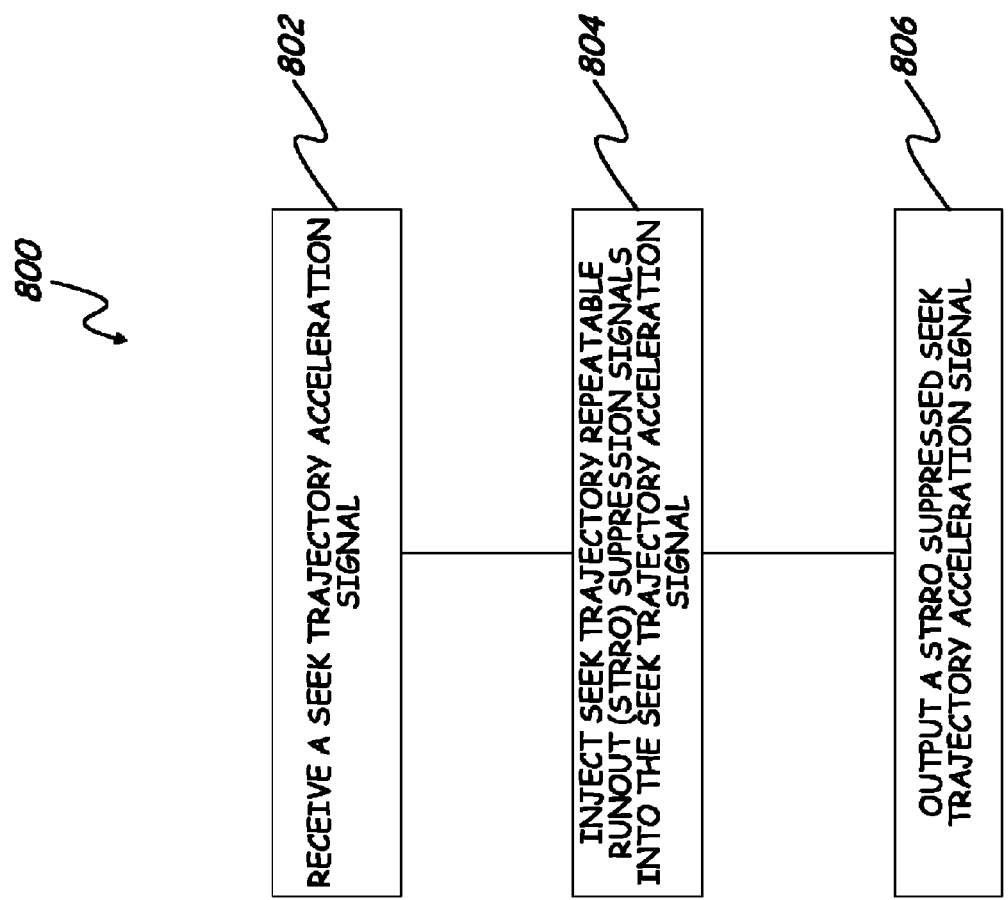
FIG. 8 is a simplified flow diagram of a method embodiment.

Referring to FIG. 8, a very simplified flow diagram of a particular illustrative embodiment of a method of suppressing seek trajectory repeatable runout is shown and generally designated 800. The method 800 may receiving a seek trajectory acceleration signal, at 802. The method may then include injecting seek trajectory repeatable runout (STRRO) suppression signals into the seek trajectory acceleration signal, at 804. At 806, a STRRO suppressed seek trajectory acceleration signal is output. As indicated above, STRRO includes repeatable runout of the seek trajectory during the movement of the actuator from an initial position to a destination track over a seek time period. In certain embodiments of the disclosure, STRRO may not include repeatable runout values during a settle period after the conclusion of the seek.

FIGS. 9A through 9D are graphs of results obtained by carrying out experiments on a disc drive that includes features of the above-described embodiments that minimize STRRO in seek operations. In the description below, plots of results obtained by carrying out experiments on the disc drive employing features of the above-described embodiments are referred to as new seek operation plots.

Figure 9C:
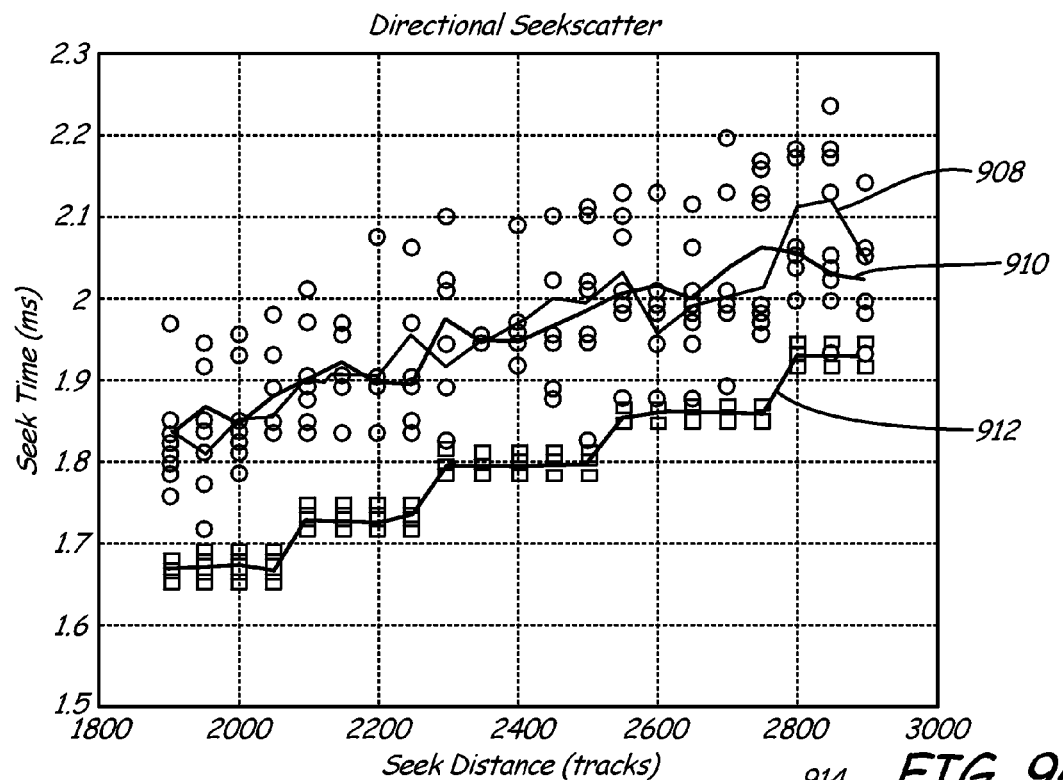
Figure 9D:
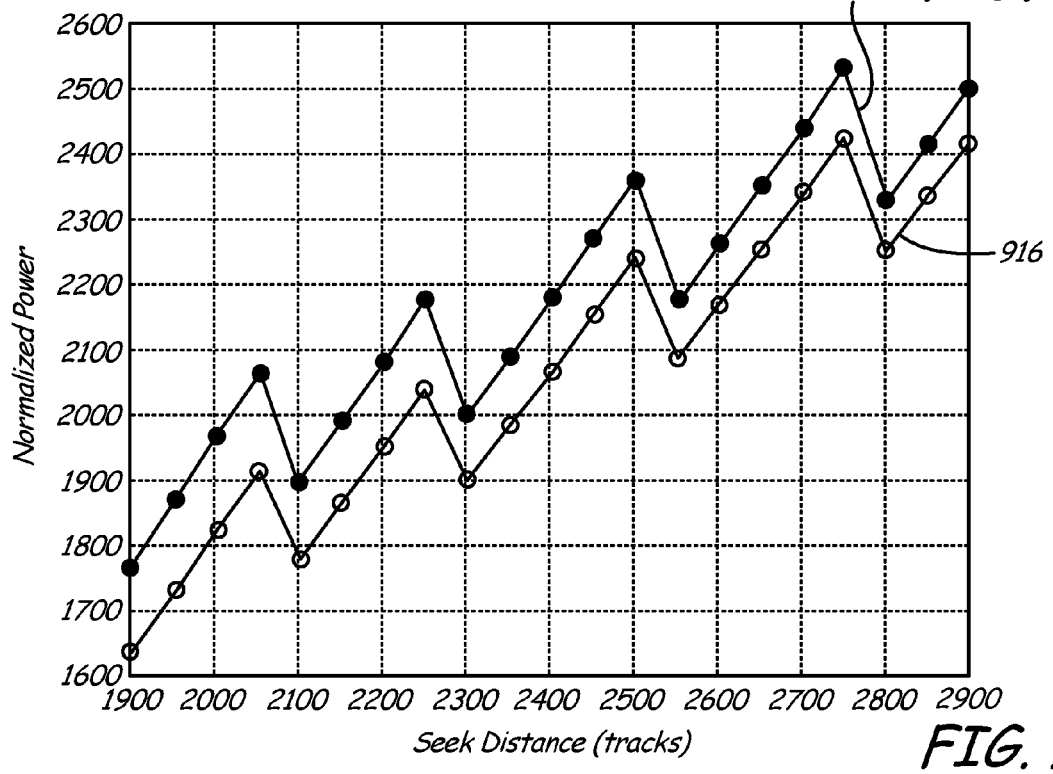

FIG. 9A is a STPES graph that includes a conventional seek operation plot 900 that shows the presence of large STPES or STRRO. In comparison, a new seek operation plot 902 includes primarily STNRRO and high frequency STRRO. FIG. 9B is a current graph that compares a conventional seek operation plot 904 with new seek operation plot 906. New seek operation plot 906 indicates a slightly reduced current compared to the conventional seek operation plot 904. The reduced current also results in reduced voltage and power. Further, a comparison between plots 904 and 906 indicates that the new seek operation completes before the conventional seek operation. FIG. 9C shows a seek time versus seek distance graph. In FIG. 9C, conventional seek operation plots are denoted by reference numerals 908 and 910 and a new seek operation plot is denoted by reference numeral 912. Compared to plots 908 and 910, new seek operation plot 910 shows a 0.15-0.2 millisecond seek/setting time reduction with almost no scatter. FIG. 9D shows a normalized power versus seek distance graph in which a conventional seek operation plot is denoted by reference numeral 914 and a new seek operation plot is denoted by reference numeral 916. A comparison of plots 914 and 916 shows a power reduction for the new seek operation.

In accordance with various embodiments, the methods described herein may be implemented as one or more software programs running on one or more microprocessors or controllers, such as the microprocessor included in servo loop 100. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising:
   a medium having tracks; and
   a seek control system comprising:
      a transducer configured to communicate with the medium when the transducer is positioned to follow any one of the tracks on the medium;
      a seek trajectory repeatable runout (STRRO) suppression component; and
      an actuator assembly that supports the transducer, the actuator assembly is configured to move the transducer in response to receiving a signal provided by the STRRO suppression component.

2. The apparatus of claim 1, wherein the STRRO suppression component comprises a STRRO suppression filter.

3. The apparatus of claim 1, wherein the seek control system further comprises a seek signal generation component that is configured to generate a seek trajectory acceleration signal and to provide the seek trajectory acceleration signal to the STRRO suppression component.

4. The apparatus of claim 3, wherein the STRRO suppression component is configured to inject STRRO suppression signals into the seek trajectory acceleration signal and to output an STRRO suppressed seek trajectory acceleration signal, and wherein the signal provided by the STRRO suppression component to the actuator assembly comprises the STRRO suppressed seek trajectory acceleration signal.

5. The apparatus of claim 4, wherein the STRRO suppressed seek trajectory acceleration signal is configured to energize the actuator to carry out a seek operation to move the transducer from an initial track of the tracks to a destination track of the tracks, and wherein the seek trajectory acceleration signal and the STRRO suppressed seek trajectory acceleration signal are functions of a seek distance that corresponds to a number of tracks between the initial track and the destination track.

6. The apparatus of claim 5, wherein the seek trajectory acceleration signal is a seek trajectory current signal.

7. The apparatus of claim 6, wherein the seek trajectory current signal is an idealized seek trajectory current signal that is determined based on a transfer function of a model of the actuator assembly.

8. The apparatus of claim 7, wherein the idealized seek trajectory current signal is determined by adjusting locations of poles and zeros of a pole-zero bump function that satisfies predetermined seek trajectory planning criteria.

9. The apparatus of claim 7 and wherein the STRRO suppression signals are determined from as least one of first order derivatives of the idealized seek trajectory current, second order derivatives of the idealized seek trajectory current or third order derivatives of the idealized seek trajectory current.

10. A servo loop comprising:
    a seek signal generation component configured to generate a seek trajectory acceleration signal; and
    a seek trajectory repeatable runout (STRRO) suppression component, coupled to the seek signal generation component, configured to inject STRRO suppression signals into the seek trajectory acceleration signal and to output an STRRO suppressed seek trajectory acceleration signal.

11. The servo loop of claim 10, further comprising:
    a medium having tracks; and
    a transducer configured to communicate with the medium when the transducer is positioned to follow any one of the tracks on the medium; and
    an actuator assembly that supports the transducer, the actuator assembly is configured to move the transducer in response to receiving the STRRO suppressed seek trajectory acceleration signal.

12. The servo loop of claim 11, wherein the STRRO suppressed seek trajectory acceleration signal is configured to energize the actuator to carry out a seek operation to move the transducer from an initial track of the tracks to a destination track of the tracks, and wherein the seek trajectory acceleration signal and the STRRO suppressed seek trajectory acceleration signal are a function of a seek distance that corresponds to a number of tracks between the initial track and the destination track.

13. The servo loop of claim 12, wherein the seek trajectory acceleration signal is a seek trajectory current signal.

14. The servo loop of claim 13, wherein the seek trajectory current signal is an idealized seek trajectory current signal that is determined based on a transfer function of a model of the actuator assembly.

15. The servo loop of claim 14, wherein the idealized seek trajectory current signal is determined by adjusting locations of poles and zeros of a pole-zero bump function that satisfies predetermined seek trajectory planning criteria.

16. The servo loop of claim 14 and wherein the STRRO suppression signals are determined from as least one of first order derivatives of the idealized seek trajectory current, second order derivatives of the idealized seek trajectory current or third order derivatives of the idealized seek trajectory current.

17. The servo loop of claim 10, wherein the STRRO suppression component comprises a STRRO suppression filter.

18. A method comprising:
    receiving, by a processor, a seek trajectory acceleration signal;
    injecting, by the processor, seek trajectory repeatable runout (STRRO) suppression signals into the seek trajectory acceleration signal; and
    outputting, by the processor, a STRRO suppressed seek trajectory acceleration signal.

19. The method of claim 18, wherein the seek trajectory acceleration signal is a seek trajectory current signal, and wherein the STRRO suppression signals are based on STRRO measurements that are carried out by:
- repeating seek operations multiple times over a same seek distance;
- for each of the multiple seek operations, computing a difference between a seek trajectory for the respective seek operation and a reference seek trajectory to obtain a seek trajectory position error signal (STPES); and
- averaging the STPES over the multiple seek operations to obtain the STRRO measurements.

* * * * *